United States Patent
Sokeila et al.

(10) Patent No.: US 12,266,085 B2
(45) Date of Patent: Apr. 1, 2025

(54) ORIENTATION-BASED FRAME SELECTION FOR COMPOSITE IMAGE CREATION

(71) Applicant: Microsoft Technology Licensing, LLC, Redmond, WA (US)

(72) Inventors: Tomi Marko Juhani Sokeila, Tampere (FI); Liisa Johanna Peltonen, Pirkkala (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 18/055,678

(22) Filed: Nov. 15, 2022

(65) Prior Publication Data

US 2024/0161241 A1  May 16, 2024

(51) Int. Cl.
| | | |
|---|---|---|
| G06T 5/50 | (2006.01) | |
| G01P 15/14 | (2013.01) | |
| G06T 7/70 | (2017.01) | |
| G06V 10/74 | (2022.01) | |

(52) U.S. Cl.
CPC ............ *G06T 5/50* (2013.01); *G01P 15/14* (2013.01); *G06T 7/70* (2017.01); *G06V 10/761* (2022.01); *G06T 2207/10016* (2013.01); *G06T 2207/20221* (2013.01)

(58) Field of Classification Search
CPC ... G06T 5/50; G06T 7/70; G06T 2207/10016; G06T 2207/20221; G01P 15/14; G06V 10/61
See application file for complete search history.

(56) References Cited

U.S. PATENT DOCUMENTS

| | | | |
|---|---|---|---|
| 10,284,794 B1 * | 5/2019 | Francois | H04N 23/64 |
| 11,107,205 B2 | 8/2021 | Hu et al. | |
| 11,315,217 B2 | 4/2022 | Ilic et al. | |
| 2012/0294549 A1 | 11/2012 | Doepke | |
| 2015/0304652 A1 | 10/2015 | Spas | |
| 2017/0237968 A1 * | 8/2017 | Resch | G06V 20/10 |
| | | | 382/103 |
| 2017/0359517 A1 | 12/2017 | Karpenko | |
| 2022/0210305 A1 | 6/2022 | Feng et al. | |

FOREIGN PATENT DOCUMENTS

| | | |
|---|---|---|
| CN | 108419023 B | 9/2020 |
| KR | 101268391 B1 | 5/2013 |

OTHER PUBLICATIONS

International Search Report and Written Opinion received for PCT Application No. PCT/US23/033777, mailed on Jan. 8, 2024, 13 pages.

* cited by examiner

Primary Examiner — Sing-Wai Wu
(74) *Attorney, Agent, or Firm* — Holzer Patel Drennan (57) ABSTRACT

A method for creating a composite image provides for determining, based on orientation sensor data sampled in association with each frame in an image sequence, camera orientation information indicating an orientation of the camera at a time that the frame was captured. Based at least in part on the orientation sensor data, a subset of orientationally-similar frames from the sequence fare identified and combined together to create the composite image.

17 Claims, 6 Drawing Sheets

ORIENTATION-BASED FRAME SELECTION FOR COMPOSITE IMAGE CREATION

BACKGROUND

Many modern imaging devices have the capability to fuse together different frames to create a composite image. For instance, some imaging devices may combine together short-exposure frames to improve image sharpness and noise characterizations in lieu of longer exposures that are vulnerable to blur due to camera movement.

SUMMARY

According to one implementation, a disclosed method for creating a composite image includes capturing a sequence of frames with a camera and determining, based at least in part on orientation sensor data sampled in association with each frame in the sequence, camera orientation information indicating relative movement of the camera between each pair of consecutively-captured frames in the sequence. The method further provides for identifying, based at least in part on the orientation sensor data, a subset of orientationally-similar frames from the sequence for which the associated camera orientation information satisfies similarity criteria; and combining together select frames from the subset of orientationally-similar frames to create the composite image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Some imaging devices maintain a "history buffer" that stores frames leading up to the moment that the user provides presses the shutter key to snap a photo. For example, a cell phone camera application may, when open, continuously capture frames and save those frames to a circular buffer of set length (e.g., a three second history buffer). In these devices, multi-frame composite images may be generated based on one or several frames captured before the user has pressed the "image capture" button, which can help compensate for human reaction time and remove the visual artifacts of user hand shake.

Newer imaging devices have increasing large memory capacities and buffer sizes. Consequently, the number of image frames now available for potential combination into composite images is larger than ever before. In light of the above, determining "which" subsets of frames to combine into a composite image has become non-trivial processing task.

One prerequisite for a high quality composite image is precise alignment between frames that are combined together to create the composite image. If the frame-to-frame alignment is imperfect, the composite image is more likely to be blurry or have other types of image artifacts. Existing image processing techniques provide some automated solutions for shifting images relative to one another, such as by using pattern recognition to identify features usable as "anchor points" to align different frames. However, it is computationally expensive to implement corrective shifts on large numbers of frames, particularly when the shifts are large. This cost can be reduced by careful selection of orientationally-similar images for composite image processing (e.g., by filtering out the orientationally dissimilar frames prior to processing); however, it is also computationally expensive to detect image offsets using traditional pixel-to-pixel pattern recognition techniques.

The herein disclosed technology utilizes orientation sensor data collected in association with sequences of images to reduce the computational cost and complexity of creating high-quality composite images. According to one implementation, an imaging device includes one or more orientation sensors, such as gyroscopes or accelerometers, that detect device orientation and/or collect data usable to determine device orientation. Using the orientation sensor data, the imaging device determines an orientation of a camera for each of multiple frames captured, and this orientation is stored in association with each captured frame. Prior to generating a composite image, the imaging device selects composite image candidates that have orientations satisfying predefined similarity criteria and uses those orientationally-similar frames to create the composite image. In effect, the disclosed techniques facilitate computationally-inexpensive image filtering of orientationally dissimilar frames to ensure that composite image processing is not performed on frames that are especially affected by hand jitter or that are inadvertently captured while the user is still positioning the camera. The herein disclosed image filtering techniques are computationally-inexpensive and also effective tools for reducing the processing complexity, latency, and cost of generating high-quality composite images.

Figure 1:
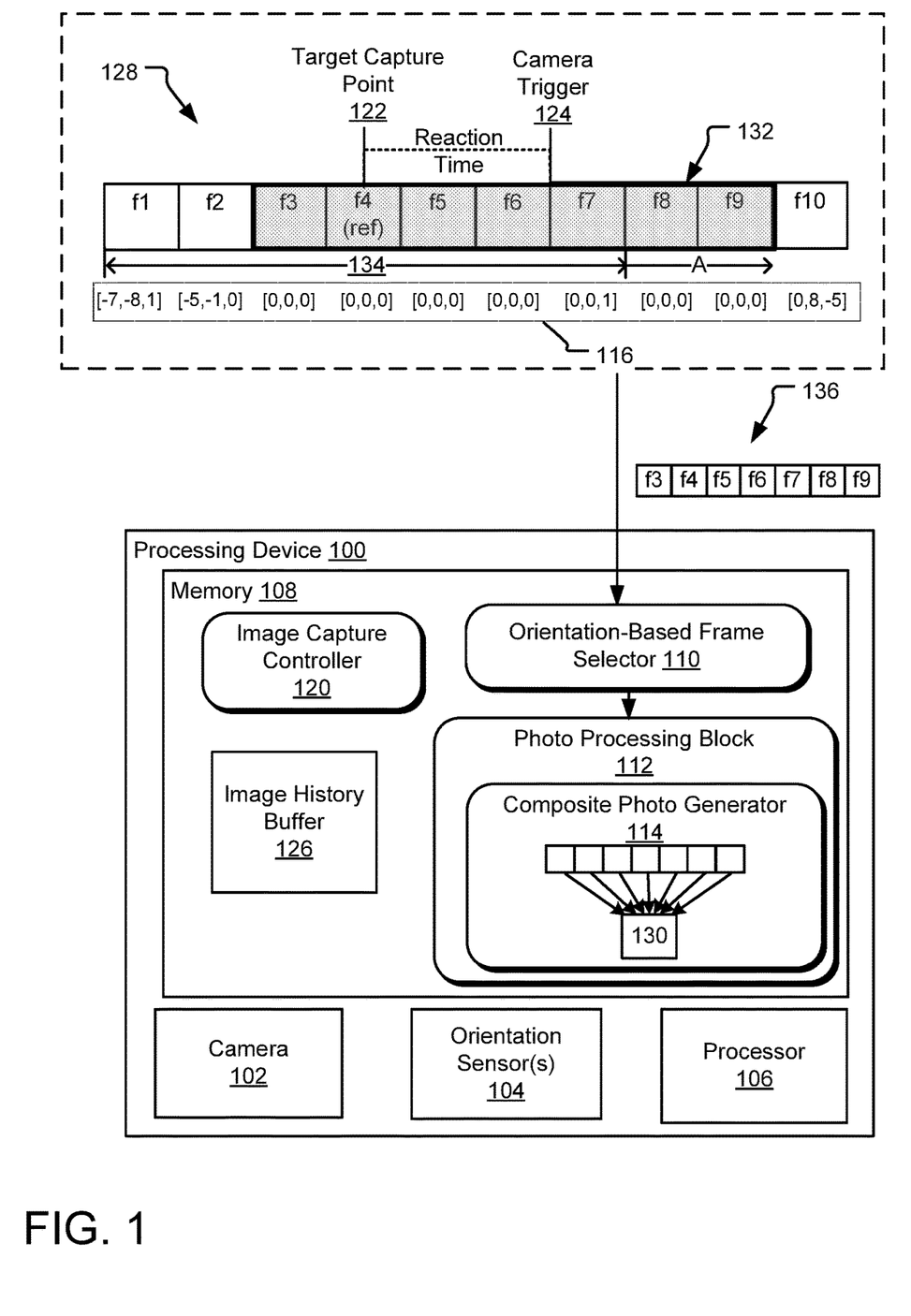
FIG. 1 illustrates an example processing device that performs orientation-based frame selection for composite image creation.

FIG. 1 illustrates an example processing device 100 that performs orientation-based frame selection for composite image creation. The processing device 100 includes at least a camera 102 and one or more orientation sensors 104, such as gyroscopes, accelerometers, or other sensors usable to determine device orientation. The processing device 100 further includes an image capture controller 120 stored in memory 108 that is executed by a processor 106 to control hardware of the camera 102 (e.g., a camera driver). In one implementation, the image capture controller 120 controls the camera 102 to automatically capture and store images in an image history buffer 126 whenever a "preview" camera mode is enabled. As used herein, a "preview" camera mode refers to a mode in which the camera is powered on and ready to receive a single user input that acts as a trigger for capturing an image. In some devices, the preview mode provides for digitally presenting, on a display of the processing device 100, an image of the scene currently within a field-of-view of the camera 102. For example, the image history buffer 126 may be a circular buffer that is continuously overwritten by capturing and storing frames at a set frame rate whenever the preview camera mode is enabled, such as by storing the past 3 seconds of collected images at any given point in time.

The image capture controller 120 executes control operations to capture additional frames in response to detecting a "camera trigger" input from a user. These frames captured following the camera trigger can be combined with frames stored in the image history buffer 126 to create an image sequence 128 corresponding to a single image capture event. By example, the image sequence 128 illustrates six frames (f1-f6) that were captured and stored in a history buffer at a set frame rate leading up to detection of a camera trigger input 124 (e.g., where the device detected the user pressing the shutter key). Following detection of the camera trigger input 124, the image capture controller 120 continues to control the camera 102 to collect images at the set frame rate for a predefined period of time that, in the illustrated example, spans an additional 4 frames. In reality, the size of the image history buffer 126 may be hundreds of frames (or larger) and the number of frames automatically captured following the camera trigger input 124 may also be greater than that shown in FIG. 1. Notably, both frame rate and the number of images captured during each imaging event may vary based on camera mode and corresponding settings.

While controlling the camera 102 to capture the image sequence 128, the image capture controller 120 samples measurements from the orientation sensor(s) 104 at times that temporally coincide with the capture of each frame in the sequence 128. From these sampled measurements, the image capture controller 120 determines and saves camera orientation information 116 in association with each individual frame. In FIG. 1, the camera orientation information 116 includes three coordinates for each frame capture, with each coordinate being indicative of an angular offset from an origin in a three-dimensional coordinate system (e.g., a pitch angle, a yaw angle, and a roll angle). In other implementations, the camera orientation information 116 may be two dimensional or single dimensional.

In one implementation, camera orientation information is sampled at a significantly higher rate than the image capture frame rate and the timestamps of the orientation sensor data samples do not precisely correspond to the timestamps of the captured frames. In this case, the image capture controller 120 analyzes the sampled data captured between each pair of consecutive frames to calculate a relative movement of the camera 102 between the frames, such as the relative movement that is observed over multiple orientation sensor data samples. This higher sample rate for the orientation sensor (s) 104 enables a relative movement analysis that is inclusive of any possible movement that occurs between frames as well as during the exposure of a single frame.

Following capture of the image sequence 128, an orientation-based frame selector 110 uses the camera orientation information 116 as a basis for selecting which images are to be provided to a photo processing block 112 for use in generating a composite image. In one implementation, the orientation-based frame selector 110 initially determines a target number of frames in the image sequence 128 to be combined into a composite image and then analyzes suitability of various individual frames for combination with other frames in the image sequence 128. In some implementations, the target number of frames is set based on camera mode. For example, a larger number of frames may be combined to create a "night mode" composite image than in other modes.

In one implementation, the orientation-based frame selector 110 executes logic for identifying a target image capture point 122 corresponding to a moment in time that the user intended to image. As shown in FIG. 1, a reference frame (ref) coinciding with the target image capture point 122 precedes the camera trigger input 124 by an interval characteristic of human reaction time (e.g., the time that it took for the user's finger to move, press the image capture button, and register a "touch" with the hardware of the processing device 100). This reaction time may be estimated by a fixed value, such as 300 to 600 ms. Subtracting this "human reaction time" interval from a timestamp corresponding to detection of the camera trigger input 124 facilitates identification of the precise moment in time that the user intended to capture. In some scenarios when there is a lot of movement between frames, a user may prefer that a composite photo include one or frames that best represent this moment in time. The exemplary operations are based on this sentiment.

To select the composite image candidates for input to the photo processing block 112, the orientation-based frame selector 110 may employ various suitable grouping and selection techniques. By example, FIG. 1 illustrates one suitable selection technique. In this implementation, the orientation-based frame selector 110 defines an initial selection window 134 that has a length equal to the target number of frames and that is initially centered on a frame at or near the target image capture point 122 (e.g., frame f4 in the example of FIG. 1). This initial selection window 134 is then shifted in time and/or trimmed such that a modified selection window 132 (e.g., final selection window) is limited to frames that satisfy predefined orientation-based similarity criteria when compared to one another.

In the example shown, the orientation-based frame selector 110 determines that the target sequence length is 7 frames and that the frame "f4" corresponds to the target image capture point 122. Consequently, the orientation-based frame selector 110 centers the initial selection window 134 on frame f4. The initial selection window 134 is 7 frames long, consisting of frames f1-f7.

The orientation-based frame selector 110 next conducts an assessment of the orientational similarity of the frames within the initial selection window 134. In various implementations, the orientational similarity of the different frames may be assessed in different ways. In one implementation, a reference frame corresponding to the target image capture point 122 is used as a baseline for comparison with other frames in the selection window. For example, the orientation-based frame selector 110 assesses orientation similarity criteria by comparing the camera orientation information 116 for the reference frame (f4) to the camera orientation information 116 of each other frame in the initial selection window 134. Frames that do not satisfy the similarity criteria with respect to the reference frame (e.g., frames that are "too dissimilar" from the reference frame orientation) are identified as "poor candidates." For example, frames that have orientations differing from the reference frame by more than 5% may be removed from the modified selection window 132 by shifting or trimming the selection window, as discussed below.

In another implementation, the similarity criteria is assessed by computing a multi-frame metric, such as a mean, average, standard deviation, or variance value with respect to a subset the frames in the image sequence 128 and by using the multi-frame metric as a baseline to compare to each individual frame. For example, the multi-frame metric may be computed based on the subset of frames in the initial selection window 134, or, alternatively, based on all frames in the image sequence 128. In this case, individual frames corresponding to camera orientations that deviate from the multi-frame metric by more than a threshold may be identified as poor candidates. For example, a frame with an orientation that differs from the mean orientation of the selection window by more than 2 percent may be identified as a poor candidate.

In other implementations, the similarity criteria do not impose a fixed similarity constraint (e.g., less than 2% deviation), but instead impose adaptive criteria for identifying a most orientationally-similar set of frames based on a target image set size. Similarity criteria depends on the targeted use case and image capture parameters of each individual imaging device and selectable camera mode of the device.

The use of similarity criteria to assess orientation sensor data allows for selection of orientationally similar frames at a very early stage in the creation of the composite image, which ultimately reduces the processing cost of creating the composite image. This processing cost is lowered both because (1) comparing orientation measurements is much less expensive in terms of computer power than comparing images to identify and quantify orientational shifts between them; and (2) because removing the most dissimilar images from the group that are to be combined into the composite image reduces the magnitude of image shifts that are implemented by image processing software.

In the example shown, the orientation-based frame selector 110 determines that the first two frames (f1, f2) in the initial selection window 134 have orientations that do not satisfy the similarity criteria with respect to the defined baseline (e.g, the reference frame (f4)). In this example, the exemplary similarity criteria are satisfied when the camera orientation information 116 of the frame differs from the camera orientation information 116 of the reference frame by less than 5% in each of the three different dimensions. Here, the orientation of the reference frame (f4) is shown as [0,0,0] for to indicate that this orientation is defined as the reference point (origin). Frame f1 has an orientation that differs by −7 degrees in a first dimension, −8 degrees in a second dimension, and 1 degree in a third dimension. Likewise, frame f2 has an orientation that differs from the orientation of the reference frame by −5 degrees in the first dimension, −1 degree in the second dimension, and 0 degrees in the third dimension. Since the frames f1 and f2 both have orientations that differ from the orientation of the reference frame (f4) by 5 percent or greater in the first dimension, these frames do not satisfy the similarity criteria.

Since frames f1 and f2 do not satisfy the similarity criteria defined with respect to the baseline being used for comparison (e.g., reference frame (f4)), the orientation-based frame selector 110 attempts to shift the selection window to exclude frames f1 and f2 by moving initial selection window 134 to the right (in direction of arrow "A") to now consist of frames f3-f9, as shown by the modified selection window 132. The orientation-based frame selector 110 then assesses the similarity of the frames in the modified selection window 132. In the illustrated example, frames f8 and f9 correspond to camera orientations identical to that of the baseline (reference frame f4). Therefore, the similarity criteria is satisfied and the 7 frames included in the modified selection window 132 are selected as "composite image components 136" and are input to the photo processing block 112.

If the above example were modified such that frames f8 and f9 did not satisfy the similarity criteria, the orientation-based frame selector 110 may, in such case, attempt to trim the modified selection window 132 so that the resulting window consists exclusively of frames that satisfy the assessed similarity criteria (e.g., frames f3-f6). Providing that the resulting window satisfies minimum length criteria (which may be implementation and/or mode-specific and different than the size of the initial selection window 134), the trimmed sequence may be selected as the composite image components 136.

In another implementation where there is a larger history buffer and/or more images captured following the camera trigger input 124, the orientation-based frame selector 110 may search for alternative subsets of the target number of frames (e.g., 7 in the FIG. 1 example) that satisfy the similarity criteria with respect to the defined baseline set of frame(s) used for comparison. In the event that the orientation-based frame selector 110 identifies two or more sequences that satisfy the assessed similarity criteria, various rules may be employed to select between such candidate sequences. For example, a longest one of these candidate sequences may be selected when "night mode" is enabled while a shorter sequence closer in time to the target image capture point 122 may be preferred in other scenarios.

Figure 4:
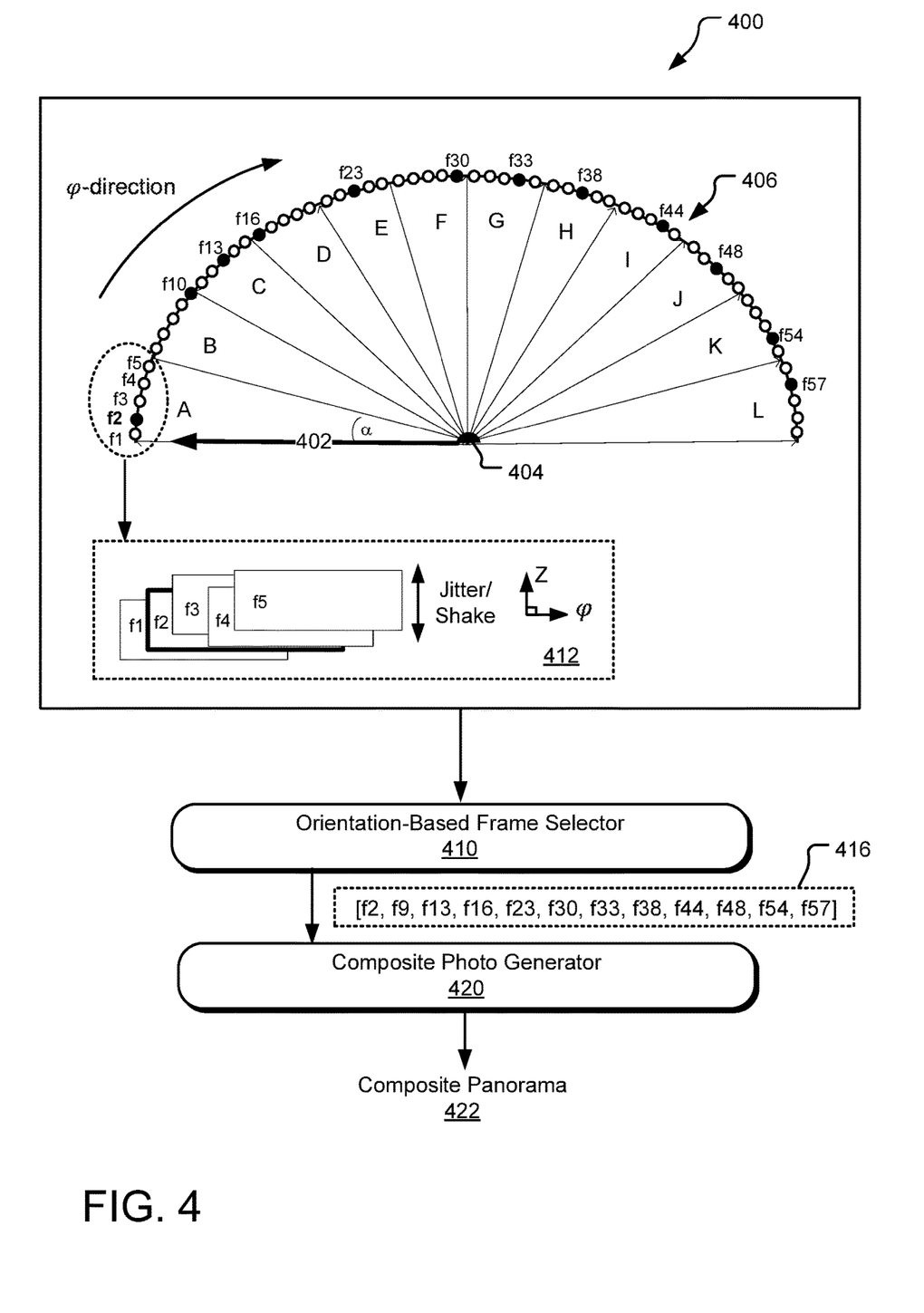
FIG. 4 illustrates example operations of another imaging device that performs orientation-based frame selection for composite photo generation in a panorama mode.

In still other implementations, the group of composite image components 136 includes some images that are not captured sequentially in the image sequence 128. For example, certain images in the middle of the initial selection window 134 may be omitted if the corresponding camera orientations do not satisfy the similarity criteria defined with respect to the remaining images that are retained in a final selection window that includes the composite image components 136. By further example, FIG. 4 illustrates one implementation where the group of composite image components 136 output by the orientation-frame selector 110 includes some images that are not captured consecutively.

Due to the above actions, the group of composite image components 136 are guaranteed to be orientationally similar in the sense that each of these photos satisfies similarity criteria defined with respect to one or more baseline frames within a final selection window (e.g., the modified selection window 132). The photo processing block 112 performs photo processing operations that may differ in different implementations. In one implementation, the photo processing block 112 performs an alignment operation that "shifts" the individual frames of the composite image components 136 relative to one another to negate camera movements and reduce blur. However, the above-described actions of the orientation-based frame selector 110 significantly reduce the processing cost of this subsequent alignment processing step by reducing the magnitude of the requisite shifts as compared to implementations that that do not perform orientation-based frame selection to select the composite image components 136.

The composite photo generator 114 generates a multi-frame composite image 130 based on the group of composite image components 136 following any interim processing operations. Notably, the photo processing block 112 may, in some implementations, perform processing operations that have the effect of removing images from the group of composite photo candidates selected by the orientation-based frame selector 110. For example, the photo processing block 112 may search for and remove frame(s) where a subject's eyes are closed, where photos are over-exposed, or unsuitable for other reasons, such as when user's thumb inadvertently covers the camera lens. In these cases, the multi-frame composite image 130 may not be a composite of the complete set of the composite image components 136 selected by the orientation-based frame selector 110; however, the composite photo is still based on the composite photo candidates in the sense that the photo processing block 112 does not perform processing operations on other photos of the image sequence 128 that are selectively excluded from the group of composite image components 136.

Figure 2:
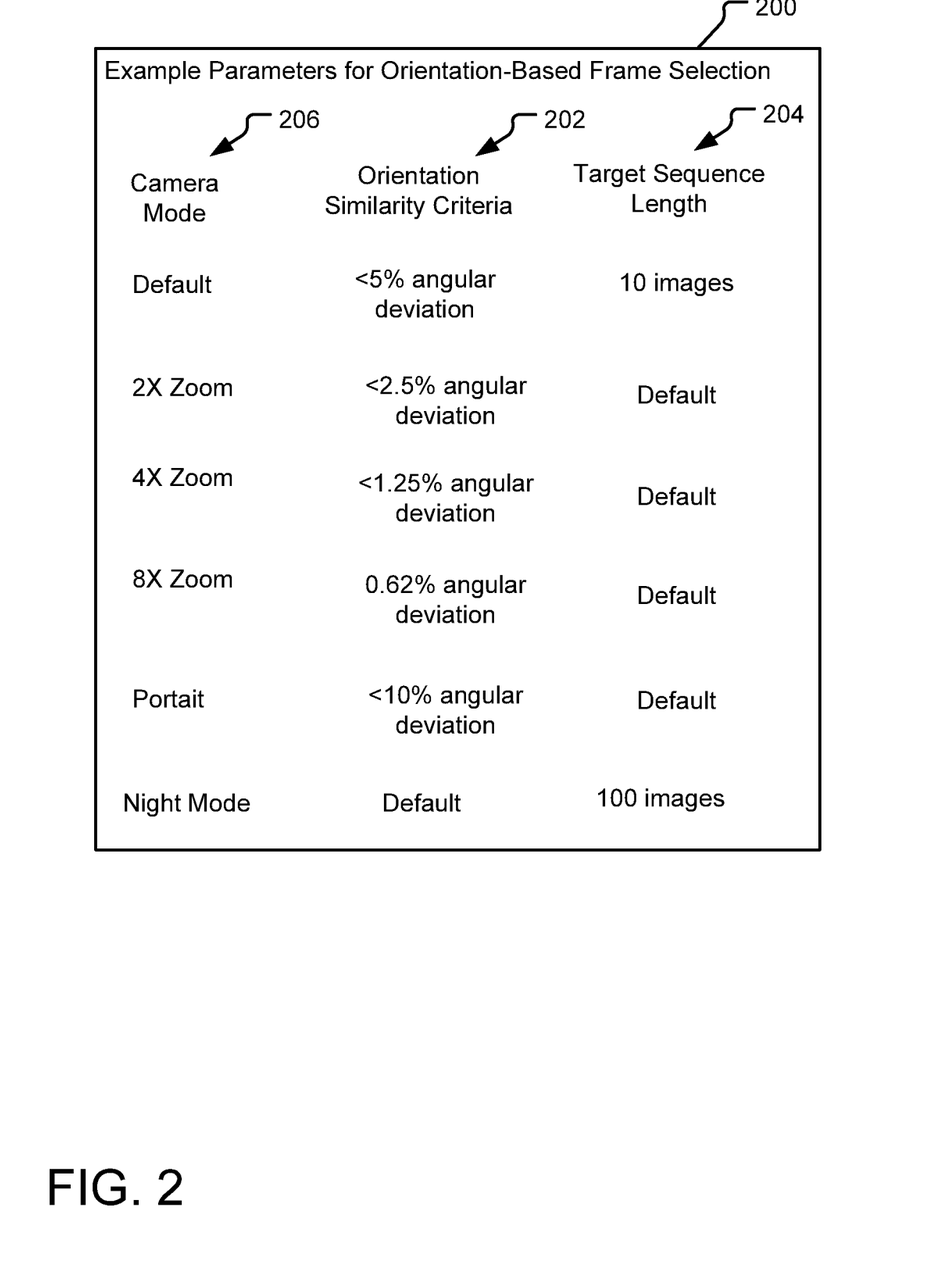
FIG. 2 illustrates a table including exemplary parameters of an imaging device that utilizes orientation-based frame selection when creating composite images.

FIG. 2 illustrates a table 200 including exemplary parameters of an imaging device that utilizes orientation-based frame selection when creating composite images. The table sets forth orientation similarity criteria 202 and a target sequence length 204 to be employed in each of multiple different camera modes 206. In one implementation, the parameters shown in the table 200 are implemented in an imaging device with characteristics and functionality the same or similar to that described with respect to FIG. 1. The orientation similarity criteria 202 indicates a maximum acceptable orientation deviation which is, in the illustrated example, shown as a net angular deviation between camera orientations of different frames that are considered similar enough to be combined into a composite image. The values provided are merely exemplary and may vary dramatically in different implementations.

In the example shown, the imaging device imposes a 5% net angular deviation as a default threshold for the "similarity criteria" (e.g., a maximum angular separation between orientations of two frames) governing whether or not the frames are similar enough to be combined in a composite image. This net angular deviation is intended to represent an angular separation between vectors defined based on sensed orientations of a camera corresponding to each captured frame.

In the example shown, the similarity criteria defines a maximum acceptable orientation deviation with a magnitude that varies in inverse proportion to the zoom level of the camera (e.g., the similarity criteria become more stringent as the zoom level of the camera is increased). This is because a set degree of angular separation becomes more noticeable as the zoom level is increased. Thus, to prevent increases in imaging processing cost at higher zoom levels, the orientation similarity criteria 202 may—as in FIG. 2—provide for decreasing a maximum angular deviation permitted between composite photo candidates in inverse proportion to the camera zoom level.

Depending on device specifications, some implementations may impose more relaxed similarity in certain modes, such as portrait mode, where the image focal point is not going to be near the edges of the captured frames (e.g., meaning that most photos are usable for the composite so long as they are adequately "shifted"). Relaxed similarity requirements may result in a larger but more orientationally dissimilar pool of photos for selection, and the advantages of a larger selection pool may in certain cases/modes outweigh the processing cost of imposing greater shifts when creating a composite image.

As mentioned elsewhere herein, some camera modes may utilize greater numbers of frames to create a composite image. As shown in the table 200, a night mode composite image may be a combination of 100 frames while composite images generated in other camera modes may combine 10 or fewer frames.

Figure 3:
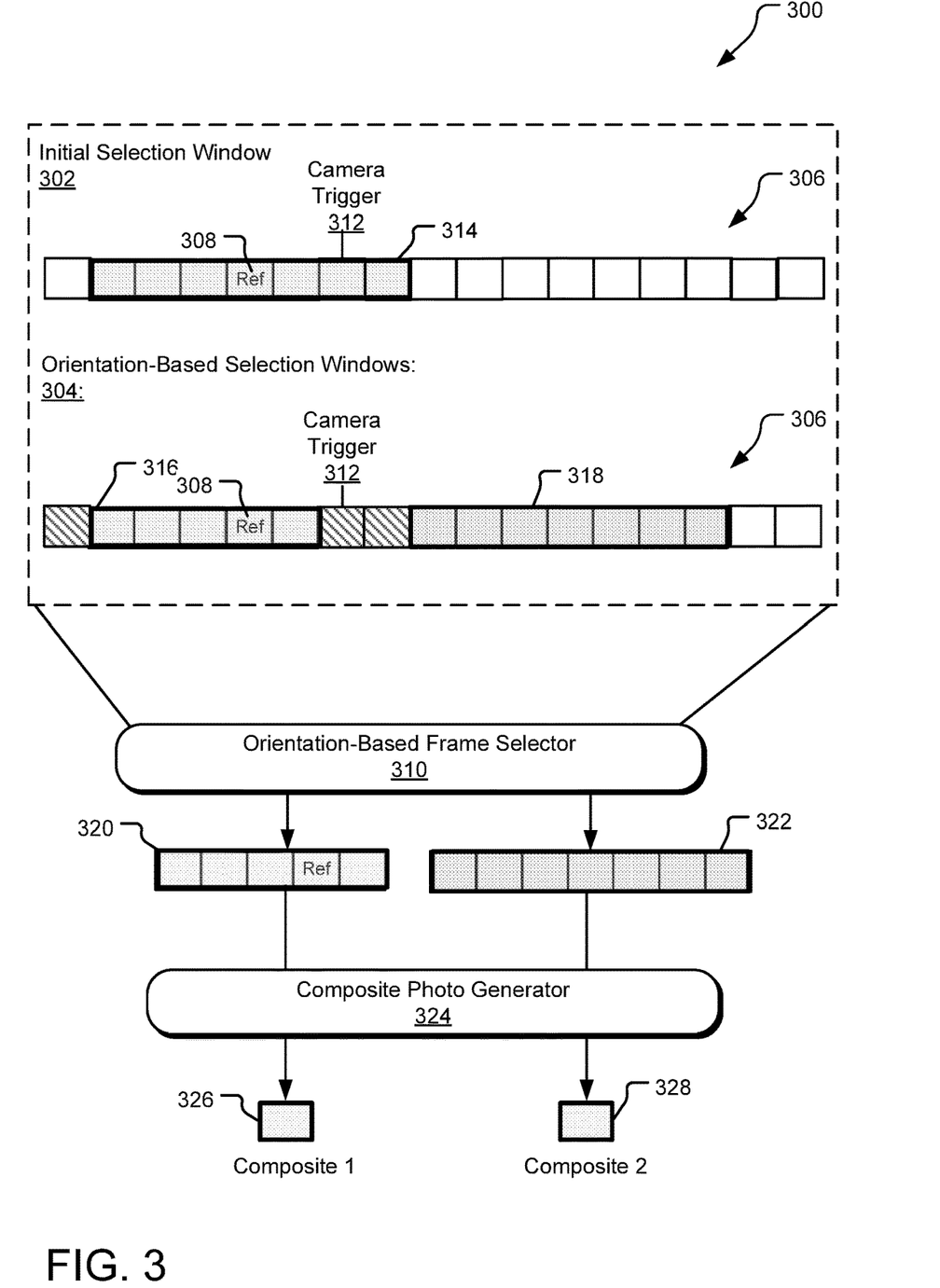
FIG. 3 illustrates additional example operations of another imaging device that performs orientation-based frame selection for composite photo generation.

FIG. 3 illustrates additional example operations 300 of another imaging device that includes an orientation-based frame selector 310 that performs orientation-based filtering for composite photo creation. In this example, the imaging device captures a sequence of frames 306 shown in each of views 302 and 304. Some of these frames precede detection of a camera trigger input 312 (e.g., are stored in a history buffer, as described with respect to FIG. 1), and some of these frames are captured following detection of the camera trigger input 312. Based on various settings of the device and a current mode of the camera, an orientation-based frame selector 310 determines applicable composite photo parameters. In various implementation, the determined composite photo parameters include similarity criteria defining a requisite degree of orientational similarity between camera orientations corresponding to different frames that are to be selected, a target number of frames to be combined, acceptable variance(s) on the target number of frames and similarity criteria, parameters defining whether the composite photo is required to be formed from sequential frames, etc.

In the example of FIG. 3, the composite photo parameters specify that the composite photo is to consist of consecutively-captured frames with a target sequence length of 7 frames and a minimum sequence length of 5 frames. In this example, the orientation-based frame selector 310 evaluates similarity criteria providing for selective exclusion of frames that correspond to camera orientations with a net angular separation of greater than 5%.

In the example shown, the orientation-based frame selector 310 identifies a reference frame 308 that precedes detection of the camera trigger input 312 by a predefined interval characteristic of human reaction time. The orientation-based frame selector 310 begins the frame selection process by considering an initial selection window 314 that is 7 frames in length and that is centered on the reference frame 308, as shown in the view 302.

The orientation-based frame selector 310 then assesses similarity criteria and selectively shifts and/or trims the initial selection window 314 in an effort to identify a group of composite photo candidates that satisfy the similarity criteria. In the illustrated example, the orientation-based frame selector 310 determines that the first frame and the last two frames in the initial selection window 314 do not satisfy the similarity criteria. Consequently, the orientation-based frame selector 310 trims the initial selection window 314 to exclude these frames, as shown by trimmed selection window 316 in the view 304. The trimmed selection window 316 is shorter than the target sequence length of 7 frames but still satisfies the minimum length of 5 frames.

In this example, the orientation-based frame selector 310 performs additional operations in an effort to identify suitable potential alternative frame sequences that are of the target length and that also satisfy the similarity criteria. Here, a secondary selection window 318 is defined to encompass a seven frame sequence immediately following the last frame in the initial selection window 314. The orientation-based frame selector 310 determines that all frames in the secondary selection window 318 satisfy the similarity criteria.

In various implementations, the orientation-based frame selector 310 may implement different prioritization rules for selecting between different identified candidate sequences (e.g., for selecting between the frame sequence included in the trimmed selection window 316 and the frame sequence included in the secondary selection window 318). In some implementations and/or camera modes, preference may be given to selecting sequences that encompass the reference frame 308. For example, if the photo is of a group of people, it may be more likely that the individuals are posed and smiling at the reference point than a few moments later. In other implementations and/or camera modes, preference may be given to selecting longer sequences even if those sequences do not include the reference frame 308. For example, composite photos without human subjects, such as those taken in landscape mode or night mode, may be less impacted by the selection of frames that are temporally offset from the reference frame 308. In some implementations, the different prioritization rules may provide for selection of a single group of frames for further processing; other implementations may support processing of multiple selected groups so as to create multiple composite photos corresponding to a same camera trigger input (e.g., the camera trigger input 312).

In the example of FIG. 3, the orientation-based frame selector 310 selects two groups of composite image components. A first one of these groups 320 corresponds to the trimmed selection window 316 and a second one of these groups 322 corresponds to the secondary selection window 318. Each of the groups 320 and 322 is input to the image processing stack that includes a composite photo generator 324. The composite photo generator 324 outputs a first composite photo 326 corresponding to the first group 320 and a second composite photo 328 corresponding to the second group 322. In one implementation, both of the composite photos 326, 328 are both automatically saved to the imaging device such that the user has a copy of both photos. In another implementation, a camera application of the imaging device may prompt the user to select one or both of the composite photos 326 and 328 for storage.

FIG. 4 illustrates example operations 400 of another imaging device that performs orientation-based frame selection for composite photo generation in a panorama mode. When a camera of the imaging device is operating in the panorama mode, a camera application may prompt the user to move the camera horizontally along the user's line of sight. For example, the camera is initially positioned at an origin 404 with a line-of-sight vector aligned with arrow 402, and the user is prompted to move the camera such that the line-of-sight vector moves clock-wise to intersect each point on an arc 406 (e.g., capturing a field-of-view that moves in the (p-direction with each consecutively-captured frame).

While the camera is being moved in this manner, an image capture controller controls the device to take a sequence of images at a predefined frame rate. The imaging device also includes one or more orientation sensors that collect data usable to derive camera orientation information, which is saved in association with each captured frame.

An orientation-based frame selector 410 performs a sequence of actions to select a subset of the photos taken along the arc 406 that are to be fused together into a composite panorama photo. First, the orientation-based frame selector 410 determines a total angular field-of-view (e.g., along the arc 406) spanned by the sequence of frames captured. This angle defined based on the movement of the camera in panorama mode is referred to below as the "panorama field-of-view." In the illustrated example, the panorama field-of-view (total φ-direction angle) is 180 degrees. However, other panorama images may span smaller or larger angles. The orientation-based frame selector 410 parses the frames of the sequence (e.g., f1-f60) within the panorama field-of-view into sampling groups that each include consecutively-captured frames associated with camera orientation within a fixed sub-angle of the panorama field of view. This fixed sub-angle is different for each one of the sampling groups and each of the sampling groups is of a fixed size.

In the example of FIG. 4, the 180 degree panorama field-of-view is divided into 12 equal-sized sampling groups, each corresponding to a letter A-L, and each including frames captured within sub-angle of 15 degrees (e.g., 180/12) along the φ-direction. For instance, sampling group A includes frames within the sub-angle corresponding to 0-15 degrees, sampling group B includes frames within the sub-angle 16-30 degrees, and so on. Notably, this example is simplified for illustration of concept; actual sub-angle ranges may be much smaller (e.g., 1-5 degrees). Due to the fixed frame rate of the camera, each of the sampling groups includes a same number of frames. In the illustrated example, there are 60 total frames captured in the sequence and five consecutively-captured frames in each sampling group The sampling group sizes are selected to ensure that there is some field-of-view overlap between any two frames in adjacent sampling groups. For example, there is some overlap between frames f1 and f10 even though they correspond to opposite sides of the sub-angles within adjacent sampling groups (e.g., f1 corresponds to a point near 0 degrees on the arc 405 while f10 corresponds to a point near 30 degrees on the arc 406). Due to this overlap between all images in each pair of adjacent sampling groups, it is possible to merge together any pair of photos sampled from two neighboring sampling groups without having a "gap" in the imaged field-of view.

The orientation-based frame selector 410 next uses the camera orientation information stored in association with each frame of the sequence to select the frames that are to be used to create the panorama photo. More specifically, the orientation-based frame selector 410 selects a group of frames that are "orientationally similar" in the sense that all selected photos satisfy a set of predefined similarity criteria when compared to one another. In the example shown, the group of selected frames consists of at least one frame corresponding to each of the sampling groups, and the predefined similarity criteria define a maximum acceptable orientation deviation in the Z-direction.

View 412 illustrates an exemplary field-of-view overlap between frames f1-f5 of the imaged sequence. In this view, it can be seen that some of the frames have misaligned edges due to jitter and shake of the user's hand while trying to steady the camera throughout the movement along the arc 406. This camera movement is detectable by comparing the camera orientation information that is saved in association with each individual frame, and frames that are especially impacted by jitter/shake can be discarded without performing computationally expensive processing operations to compare the images, identify common anchor points, and measure such offsets.

In one implementation, the similarity criteria are set to ensure that all frames used to create the panorama image have a z-direction misalignment that is capped to some maximum offset value (where the z-direction is defined to be perpendicular to the φ-direction, as shown in view 412).

Various different algorithmic techniques may be used to assess the similarity criteria and identify the collection of frame that satisfy the similarity criteria with respect to one another. In the example of FIG. 4, the orientation-based frame selector 410 selects a single frame from each of the sampling groups. For example, the orientation-based frame selector 410 selects, from each of the sampling groups A-L, the frame having a z-direction center that is closest to an average z-direction center computed across all 60 frames. These selected frames form a group of composite photo components 416 that are input to a composite photo generator 420.

In one implementation, the image capture controller of the imaging device prompts the user to move the camera up and down (in the Z-direction) while moving the camera horizontally (in the φ-direction) to capture a panorama image (e.g., so that the camera field-of-view traces a somewhat sinusoidal path). In this implementation, the orientation-based frame selector 410 employs logic to select multiple vertically offset frames within each sampling group, A-L, to be added into the composite image and thereby expand the field-of-view in the vertical direction. For example, three vertically-offset images could be selected from the "A" sampling group—a first image that is near the center of the horizontal frame (e.g., corresponding to frame f2 in in FIG. 4), a second image that is offset in the negative z-direction, and a third image that is offset in the positive z-direction. These three images—all from the "A" sub-angle in the yo-direction—could then be fused together to effectively expand the image in the Z-direction. This process could then be repeated for each different φ-direction sampling group—e.g., sub-angle "B," "C," "D," etc.

In the above-described implementation where multiple vertically offset images are selected from each of the sampling groups A-L, the orientation-based frame selector 410 assesses similarity criteria to select images with vertically offsets that are orientationally similar across the sampling groups A-L. Assume, for example, that three vertically offset images are to be selected from each one of sampling groups A, B, C, etc., where one image has an –Z orientation, one is taken from near the Z-origin, and one has a +Z orientation. In this case, the orientation-based frame selector 410 assesses similarity criteria to (1) select a set of +Z images that are orientationally similar to one another, e.g., one +Z image from each of sampling groups A-L; (2) to select a set of –Z images that are orientationally similar, e.g., one –Z image from each of the sampling groups A-L; and (3) to select a set of near Z-origin images that are orientationally similar. These selected images are then all input to the composite photo generator 420 to be fused into a panorama with Z-direction field-of-view that is larger than the camera's z-direction field-of-view.

Prior to creating a composite photo, the composite photo generator 420 may perform various processing operations that vary in different implementations, such as operations to shift the photos for a more precise z-direction alignment, to improve contrast, remove red-eye, etc. The composite photo generator 420 then fuses together the selected photos and outputs a composite panorama 422.

The computational cost of the composite panorama 422 is reduced by the orientation-based frame selection because the image processing software does not have to correct for larger z-direction offsets and/or identify and discard photos that are unsuitable for use in the composite image due to insufficient z-directional areal overlap with other selected temporally-adjacent photos.

Figure 5:
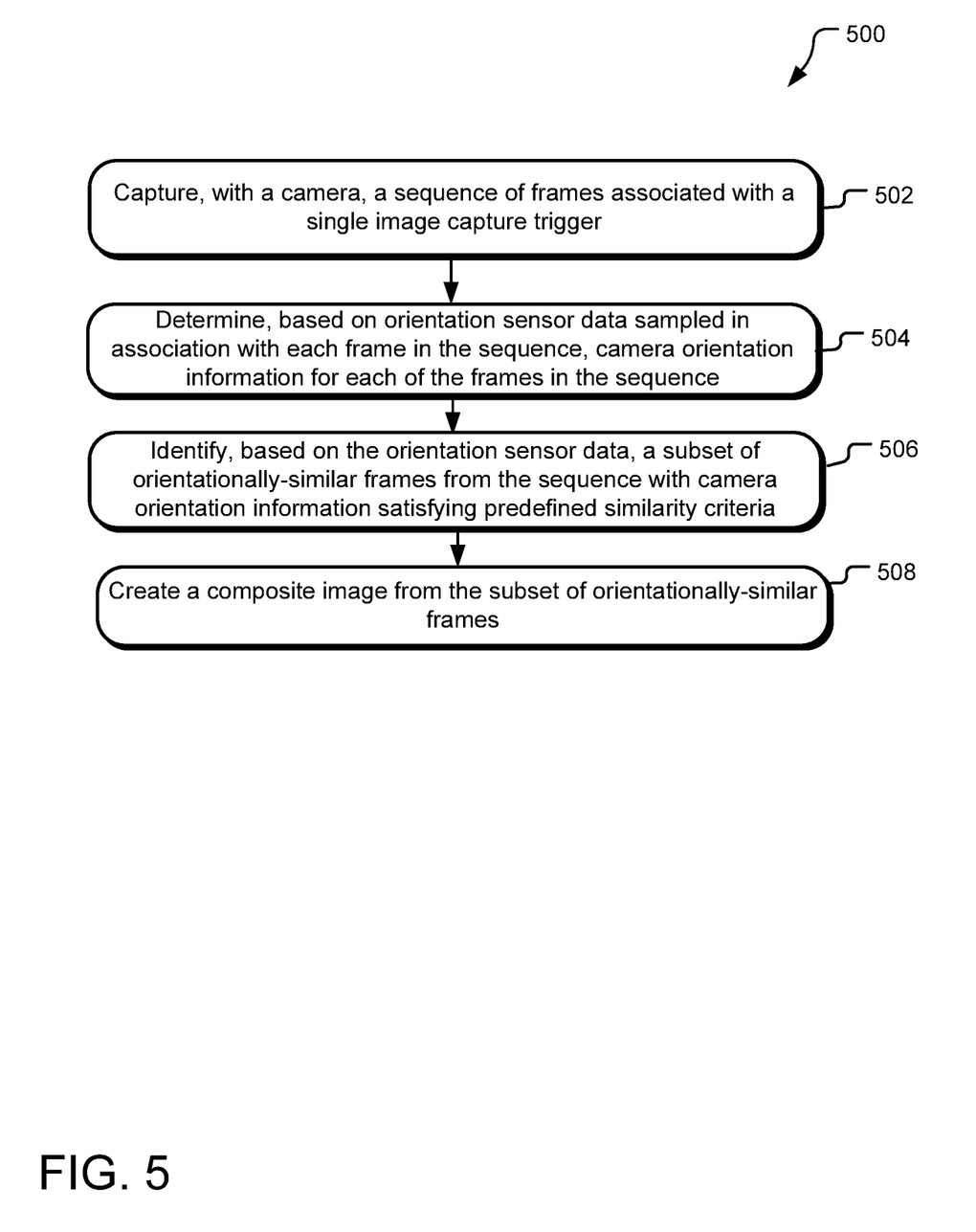
FIG. 5 illustrates example operations for using orientation-based image filtering to reduce the processing cost of creating a composite photo from multiple frames.

FIG. 5 illustrates example operations 500 for using orientation-based image filtering to reduce the processing cost of creating a composite photo from multiple frames. An image capture operation 502 captures, with a camera, a sequence of frames associated with a single image capture trigger. In one implementation, the sequence includes a subset of frames temporally preceding the image capture trigger that are stored in a history buffer. The sequence also includes one or more frames captured at or after the image capture trigger than are combined with the subset of frames in the history buffer to create the sequence of frames.

The camera performing the image capture operation 502 is included in an imaging device that includes one or more orientation sensors. Orientation sensor data (e.g., gyroscope data and/or accelerometer data) is sampled, for each frame, at a time that precisely corresponds to the capture of the frame. This orientation sensor data is stored in association with each frame. For example, the history buffer includes gyroscope data sampled in association with each stored frame.

A determination operation 504 determines, based on the sampled orientation sensor data, camera orientation information for each frame. An identification operation 506 identifies a subset of orientationally-similar frames from the sequence that have camera orientation information satisfying predefined similarity criteria. The predefined similarity criteria define a maximum acceptable orientation deviation in at least one dimension. When assessing the similarity criteria, each frame is compared to a baseline that includes one or more other images in the sequence. In one implementation, the baseline is a single frame. For example, the similarity criteria for each individual frame is evaluated with respect to a single reference frame. In other implementations, the similarity criteria for each individual frame is evaluated with respect to a metric representing a group of frames. For example, the orientation of a single frame may be compared to an average orientation of a group of frames in the sequence. If the single frame and the baseline frame(s) do not satisfy the similarity criteria, the single frame is not included in the identified subset of orientationally-similar frames.

A composite image creation operation 508 creates a composite image from the subset of orientationally-similar frames. For example, the subset of orientationally-similar frames are fused together (e.g., pixel values added, averaged, or other combinatorial operation) to create the composite image. The composite image creation operation 508 may entail some image processing on each frame of the identified subset, such as processing to more precisely align the frames. The cost of these processing operations can be reduced in proportion to the stringency of the similarity criteria. When tighter similarity requirements are imposed, the resulting image "shifts" performed during image processing are fewer and smaller in magnitude. In some cases, use of the disclosed orientation-based selection techniques may eliminate the need to perform image shifting operations during image processing.

Moreover, since the determination operation 504 relies on sampled orientation sensor data, the similarity criteria can be assessed without employing computationally expensive image analysis techniques, such as pixel-to-pixel comparisons to determine orientational offsets.

Figure 6:
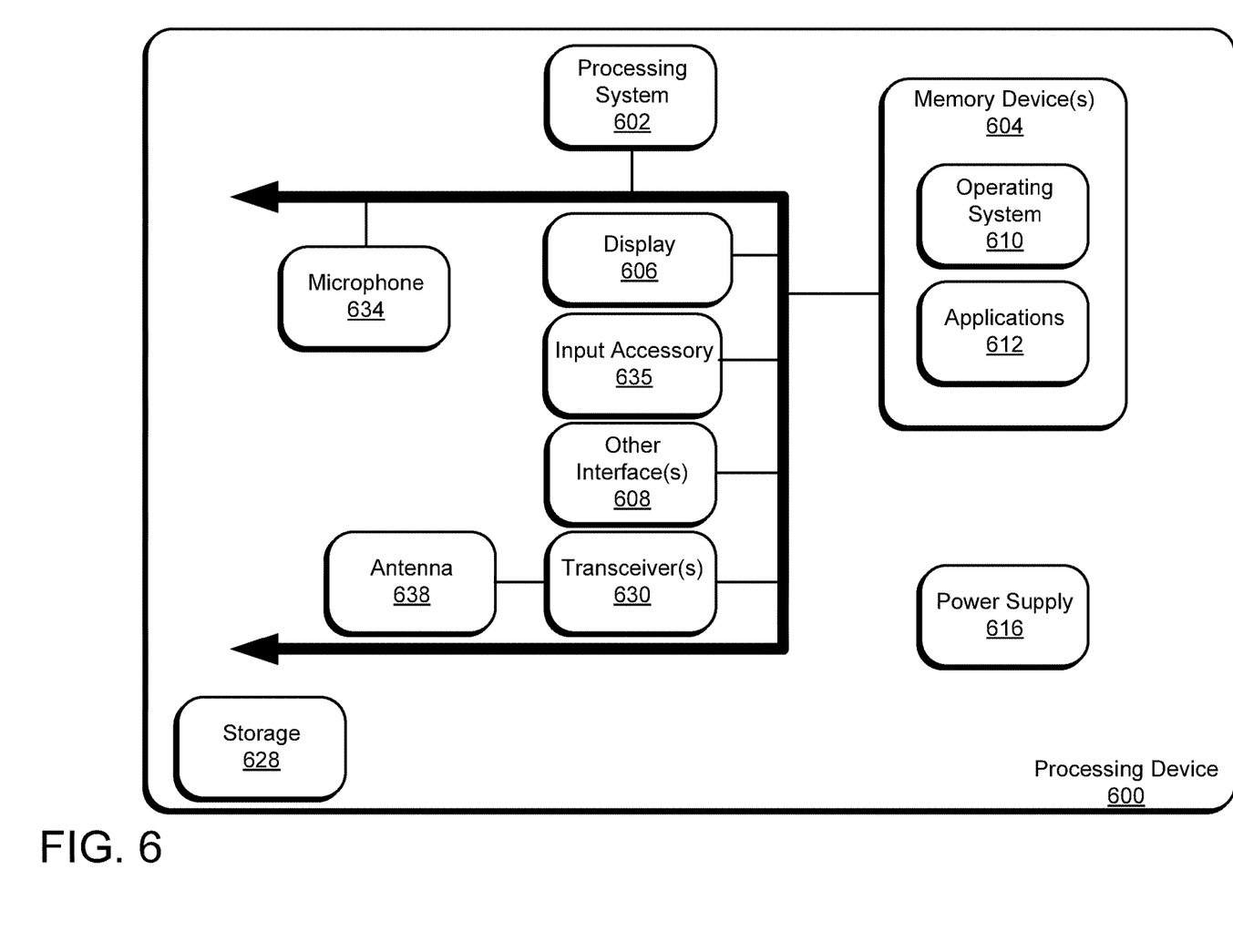
FIG. 6 illustrates an example schematic of a processing device suitable for implementing aspects of the disclosed technology

FIG. 6 illustrates an example schematic of a processing device 600 suitable for implementing aspects of the disclosed technology. In one implementation, the processing device 600 is a personal electronic device, such as a cell phone, tablet, or laptop.

The processing device 600 includes a processing system 602, memory device(s) 604, the display 606, and other interfaces 608 (e.g., buttons). The memory device(s) 604 generally includes both volatile memory (e.g., RAM) and non-volatile memory (e.g., flash memory). An operating system 610 may reside in the memory device(s) 604 and be executed by the processing system 602. One or more applications 612, such as an orientation-based frame selector 110 and composite photo generator 114 may be loaded in the memory and executed on the operating system 610 by the processing system 602.

The processing device 600 includes a power supply 616, which is powered by one or more batteries or other power sources and which provides power to other components of the processing device 600. Additionally, the processing device 600 includes one or more communication transceivers 630 and an antenna 632 to provide network connectivity (e.g., a mobile phone network, Wi-Fi®, BlueTooth®). The processing device 600 may be further coupled to various input devices 634 such as a microphone, keyboard, touch display, etc. In an implementation, an installation script generation engine, along with other various applications and other modules and services, are embodied by instructions stored in memory device(s) 604 and/or storage devices 628 and processed by the processing system 602. The memory device(s) 604 may be memory of host device or of an accessory that couples to a host. The installation script generation engine my include a trained multi-layer neural network that is saved in the memory device(s) 604 or saved in memory of one or more other compute devices (e.g., various interconnected processing nodes) that are communicatively coupled to the processing device 600, such as via the internet.

The processing device 600 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein. The following summary provides a non-exhaustive set of illustrative examples of the technology set forth herein.

(A1) According to a first aspect, some implementations include a method for creating a composite image. The method includes determining, based at least in part on orientation sensor data sampled in association with each frame in a sequence of frames captured by a camera, camera orientation information indicating relative movement of the camera between each pair of consecutively-captured frames. The method further includes identifying a subset of orientationally-similar frames from the sequence for which the associated camera orientation information satisfies similarity criteria and combining together select frames from the subset of orientationally-similar frames to create the composite image.

(A2) In some implementations of A1, the method further comprises filtering from the subset of orientationally-similar frames a set of frames in the sequence corresponding to camera orientations that do not satisfy the similarity criteria.

The methods of A1 and A2 are advantageous because initial "filtering" of images with significant orientational differences can reduce the amount of processing that is needed during creation of the composite image (e.g., by reducing the magnitude of the requisite pixel shifting that is performed to align the different images). Moreover, the use of orientation sensor (e.g., gyro) data rather to detect orientational differences is much more efficient in terms of processing cost than traditional pixel-to-pixel image comparison techniques.

(A3) In some implementations of A1-A2, the method further comprises storing, in a history buffer, the camera orientation information determined in association with each of multiple frame of the sequence.

The method of A3 is advantageous because it allows for composite image creation based on some frames captured before the user presses the shutter key, and these frames are likely to correspond the moment in time the user intended to photograph (e.g., subtracting off the human reaction time that elapsed while the user actually reached for and pressed the shutter key).

(A4) In some implementations of A1-A3, the sensor data includes at least one of gyroscope data and accelerometer data from which camera orientation can be extracted.

(A5) In some implementations of A1-A4, the method further includes determining the similarity criteria based at least in part on a current mode of the camera. The method of A5 is advantageous because it facilitates use of different image filtering constraints selected based on the type of image being created and/or the type of processing that is to be performed on the image. For example, more relaxed similarity criteria may be utilized in portrait mode where the target of the image is likely to be centered and/or the background likely to be blurred during processing (e.g., scenarios that make relative shifts less problematic).

(A6) In some implementations of A1-A6, the similarity criteria defines a maximum acceptable orientation deviation in at least one dimension. The maximum acceptable orientation deviation has a magnitude that varies in inverse proportion to the zoom level of the camera. The method of A6 is advantageous because it provides for selecting composite image components that have a higher degree of orientational similarity at higher zoom levels where relative offsets of the camera are effectively magnified and therefore, more noticeable.

(A7) In some implementations of A1-A7, the method further includes: identifying a first frame in the sequence corresponding to an image capture trigger event; identifying a target image capture point preceding the first frame event by an interval characteristic of human reaction time; defining an initial frame sequence interval based at least in part on the target image capture point; and modifying the initial frame sequence interval by trimming or shifting the initial frame sequence interval to exclude frames corresponding to sensed orientations that do not satisfy the similarity criteria when compared to one another.

The method of A7 is advantageous because it facilitates selection of a group of images that tightly encompass a precise moment in time that the user intended to photograph.

(A8) In some implementations of A1-A8, the method further includes identifying multiple subsets of consecutively-captured and orientationally-similar frames and creating multiple composite images that are each created from a corresponding one of the multiple subsets.

(A9) In still other implementations of A1-A9, the composite image is a panorama and the method further includes determining a total angular field-of-view spanned by the sequence of frames based at least in part on the camera orientation information and parsing frames of the sequence into sampling groups that each include consecutively-captured frames associated with camera orientations within a fixed sub-angle of the total angular field-of-view. The fixed sub-angle for each one of the sampling groups is of equal size and spans a different angular range. In this method, identifying the subset of frames further includes selecting at least one image from each of the sampling groups based an orientation of the image determined from the sampled sensor data. The method of claim 9 is advantageous because it allows for a selection of orientationally-similar images that can be combined into a panorama at a significantly lower processing cost than that of traditional panorama-creation methods.

In another aspect, some implementations include a computing system for creating a composite image. The computing system includes hardware logic circuitry that is configured to perform any of the methods described herein (e.g., methods A1-A9).

In yet another aspect, some implementations include a computer-readable storage medium for storing computer-readable instructions. The computer-readable instructions, when executed by one or more hardware processors, perform any of the methods described herein (e.g., methods A1-A9).

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for creating a composite image, the method comprising:
    determining, based at least in part on orientation sensor data sampled in association with each frame in a sequence of frames captured by a camera, camera orientation information indicating relative movement of the camera between each pair of consecutively-captured frames;
    identifying a first frame in the sequence corresponding to an image capture trigger event;
    identifying a target image capture point preceding the image capture trigger event by an interval characteristic of human reaction time;
    defining an initial frame sequence interval based at least in part on the target image capture point;
    creating a subset of orientationally-similar frames by trimming or shifting the initial frame sequence interval to exclude frames corresponding to camera orientations that do not satisfy similarity criteria; and
    combining together select frames from the subset of orientationally-similar frames to create the composite image.

2. The method of claim 1, further comprising:
    storing, in a history buffer, the camera orientation information determined in association with each of multiple frames of the sequence.

3. The method of claim 1, wherein the orientation sensor data includes at least one of gyroscope data and accelerometer data.

4. The method of claim 1, further comprising:
    determining the similarity criteria based at least in part on a current mode of the camera.

5. The method of claim 4, wherein the similarity criteria defines a maximum acceptable orientation deviation in at least one dimension, the maximum acceptable orientation deviation having a magnitude that varies in inverse proportion to a zoom level of the camera.

6. The method of claim 1, further comprising:
    identifying multiple subsets of orientationally-similar frames in the sequence, each of the multiple subsets consisting of consecutively-captured frames; and
    creating multiple composite images, each of the multiple composite images being created from a corresponding one of the multiple subsets of orientationally-similar frames.

7. The method of claim 1, wherein the composite image is a panorama and the method further comprises:
    based at least in part on the camera orientation information, determining a total angular field-of-view spanned by the sequence of frames; and
    parsing frames of the sequence into sampling groups that each include consecutively-captured frames associated with camera orientations within a fixed sub-angle of the total angular field-of-view, the fixed sub-angle for each one of the sampling groups being of equal size and spanning a different angular range,
    wherein identifying the subset of orientationally-similar frames further includes selecting at least one image from each of the sampling groups based an orientation of the image determined from the sampled sensor data.

8. A system for creating a composite image, the system comprising:
a processor;
memory;
a frame capture controller stored in the memory and executed by the processor that provides control signals to a camera to capture a sequence of frames at a select frame rate;
an orientation-based frame selector stored in the memory that:
determines, based at least in part on orientation sensor data sampled in association with each frame in the sequence, camera orientation information in association with each of the frame in the sequence;
identifies a first frame in the sequence corresponding to an image capture trigger event;
identifies a target image capture point preceding the image capture trigger event by an interval characteristic of human reaction time;
defines an initial frame sequence interval based at least in part on the target image capture point;
creates a subset of orientationally-similar frames by trimming or shifting the initial frame sequence interval to exclude frames corresponding to camera orientations that do not satisfy similarity criteria; and
a composite photo generator that combines together select frames from the subset of orientationally-similar frames to create the composite image.

9. The system of claim 8, wherein the sensor data includes at least one of gyroscope data and accelerometer data.

10. The system of claim 8, wherein the orientation-based frame selector is further configured to determine, based at least in part on a current camera mode, the similarity criteria.

11. The system of claim 10, wherein the similarity criteria defines a maximum acceptable orientation deviation in at least one dimension, the maximum acceptable orientation deviation having a magnitude that varies in inverse proportion to a zoom level of the camera.

12. The system of claim 10, wherein the orientation-based frame selector is further configured to:
identify multiple subsets of orientationally-similar frames in the sequence, each of the multiple subsets consisting of consecutively-captured frames, wherein the composite photo generator creates multiple composite images, each of the multiple composite images being based created from a corresponding one of the multiple subsets of orientationally-similar frames.

13. The system of claim 10, wherein the composite image is a panorama and the orientation-based frame selector is further configured to:
determining a total angular field-of-view spanned by the sequence of frames; and
parse frames of the sequence into sampling groups that each include consecutively-captured frames associated with camera orientations within a fixed sub-angle of the total angular field-of-view, the fixed sub-angle for each one of the sampling groups being of equal size and spanning a different angular range, wherein identifying the subset of orientationally-similar frames further includes selecting at least one image from each of the sampling groups based an orientation of the image determined from the sampled sensor data.

14. One or more tangible computer-readable storage media storing computer-executable instructions for executing a computer process comprising:
capturing a sequence of frames with a camera of an electronic device;
determining, based at least in part on orientation sensor data sampled in association with each frame in the sequence, camera orientation information indicating relative movement of the camera between each pair of consecutively-captured frames in the sequence;
identifying a first frame in the sequence corresponding to an image capture trigger event;
identifying a target image capture point preceding the image capture trigger event by an interval characteristic of human reaction time;
defining an initial frame sequence interval based at least in part on the target image capture point;
creating a subset of orientationally-similar frames by trimming or shifting the initial frame sequence interval to exclude frames corresponding to camera orientations that do not satisfy similarity criteria; and
combining together select frames from the subset of orientationally-similar frames to create a composite image.

15. The one or more tangible computer-readable storage media of claim 14, further comprising:
storing, in a history buffer of the electronic device, the camera orientation information determined in association with each of multiple frames of the sequence.

16. The one or more tangible computer-readable storage media of claim 14, wherein the sensor data includes at least one of gyroscope data and accelerometer data and the process further comprises determining, based at least in part on a current camera mode, the similarity criteria.

17. The one or more tangible computer-readable storage media of claim 14, wherein the composite image is a panorama and the computer process further comprises:
based at least in part on the camera orientation information, determining a total angular field-of-view spanned by the sequence of frames; and
parsing frames of the sequence into sampling groups that each include consecutively-captured frames associated with camera orientations within a fixed sub-angle of the total angular field-of-view, the fixed sub-angle for each one of the sampling groups being of equal size and spanning a different angular range,
wherein identifying the subset of orientationally-similar frames further includes selecting at least one image from each of the sampling groups based an orientation of the image determined from the sampled sensor data.

* * * * *